Sept. 4, 1962  A. EINFALT  3,052,059
TOY RAILROADS
Filed March 25, 1960  2 Sheets-Sheet 1
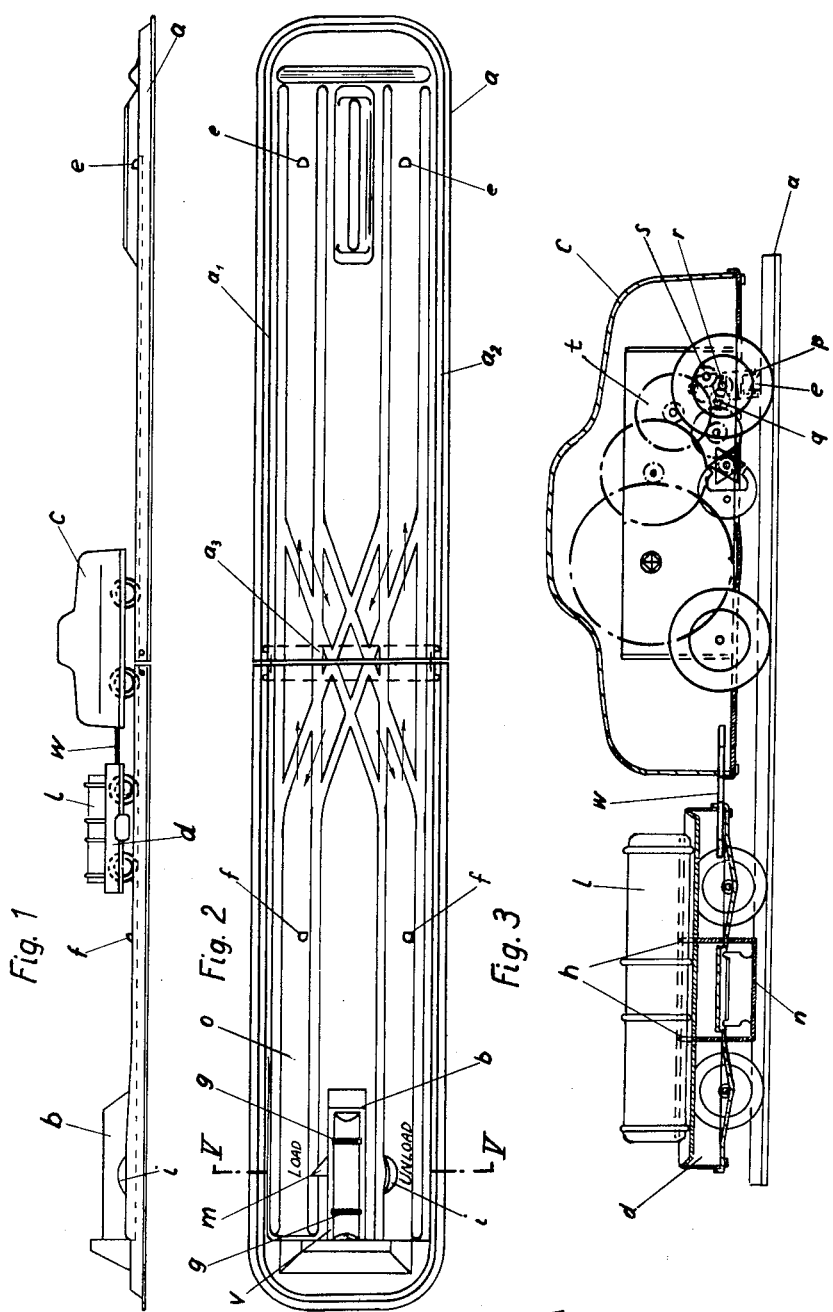

Sept. 4, 1962  A. EINFALT  3,052,059
TOY RAILROADS
Filed March 25, 1960  2 Sheets-Sheet 2
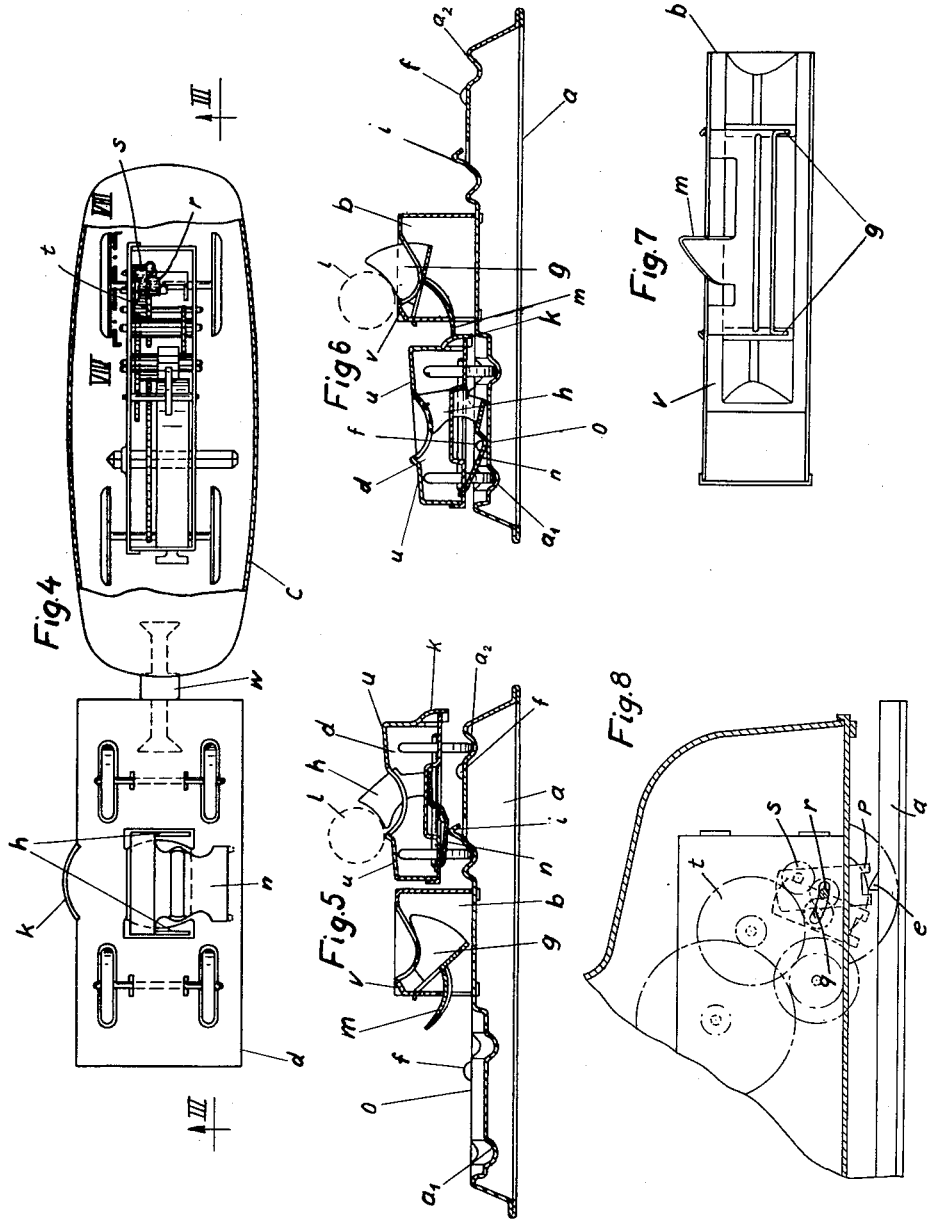

United States Patent Office 3,052,059
Patented Sept. 4, 1962

3,052,059
TOY RAILROADS
Alfred Einfalt, Nurnberg, Bavaria, Germany, assignor to Gebruder Einfalt Blechspielwarenfabrik, Nurnberg, Bavaria, Germany
Filed Mar. 25, 1960, Ser. No. 17,587
Claims priority, application Germany Nov. 18, 1959
6 Claims. (Cl. 46—40)

The invention relates to a toy railroad consisting of a goods yard and a self-propelled vehicle, reversible in the end positions of said yard, with a trailer vehicle capable of being coupled and uncoupled with the self-propelled vehicle and of being loaded and unloaded.

The object is to make a toy of this kind more interesting in that the loading and unloading of the trailer vehicle takes place automatically.

According to the invention a loading ramp is provided at at least one end of the goods yard from which ramp a load can be mechanically charged on to the trailer and discharged therefrom.

This object is preferably achieved in that the charging of the load on to the trailer is effected by means of carriers on the loading ramp and on the trailer which can each swing about an axle arranged parallel to the direction of travel. It is advisable to swing these carriers outwards by means of control arms within the range of movement of which a control nose is arranged on the track for the carrier on the trailer and another control nose on the trailer for the carrier on the ramp. These control arms may be lugs bent out from the carriers and the control noses can be lugs bent out from the track and the trailer housing respectively.

Another feature of the invention consists in constructing the trailer vehicle so that its loading surface slopes downwards from the loading side to the unloading side. Constructing the surface of the trailer vehicle in this manner presents the advantage that the transfer of the load is effectively assisted by the inclined surface both during the loading and also during the unloading operation. For the same reason it is advantageous to provide the side of the loading ramp from which the trailer vehicle is loaded with a downwardly sloping edge so that the material being loaded will pass reliably from the ramp on to the trailer vehicle. Other features and advantages of the invention will become apparent from the following description of one embodiment of the invention illustrated by way of example in the accompanying drawings, in which FIG. 1 shows a goods yard in side elevation;

FIG. 2 is a plan view of the railroad goods yard;

FIG. 3 is a section through the self-propelled vehicle and the loaded trailer vehicle, taken on line III—III of FIG. 4;

FIG. 4 is a bottom plan view of the self-propelled vehicle and the trailer vehicle, the self-propelled vehicle being partly broken open;

FIG. 5 is a section taken on line V—V of FIG. 2, with the trailer being unloaded;

FIG. 6 is a similar section to FIG. 5 wherein the trailer vehicle is in the course of being loaded;

FIG. 7 shows the loading ramp in bottom plan view, and

FIG. 8 is a part section on line VIII—VIII of FIG. 4.

The goods yard $a$ of the toy railroad consists of two parallel tracks $a_1$ and $a_2$ which are interconnected by a diamond crossing $a_3$. To bring about the switching of the cars between the tracks $a_1$ and $a_2$, any suitable known or otherwise obvious switch means may be used to cause the cars to proceed in the directions indicated by the arrows in FIGURE 2. A ramp $b$ is arranged at one end of the goods yard.

A train composed of a self-propelled or tractor vehicle $c$ and a trailer vehicle $d$ runs alternately on the tracks $a_1$ and $a_2$ of the railroad goods yard, the change-over from one track to the other being effected by the crossing $a_3$. The reversal of the direction of travel of the train is effected by trippers $e$ and $f$ arranged between the rails.

The ramp $b$ arranged at one end of the railroad goods yard is provided with an oscillatable carrier $g$ which in its inoperative position is located within the ramp. The trailer vehicle $d$ is equipped with a similar carrier $h$ which in its inoperative position is located in the interior of the trailer vehicle housing. These carriers, in conjunction with a control nose $k$ on the trailer $d$ and a control nose $i$ on the track $a_2$, effect an automatic transfer of the load $l$ from the trailer vehicle on to the ramp and, after the train has changed over on to the track $a_1$, the transfer of the load from the ramp $b$ on to the trailer vehicle $d$.

The carriers $g$ and $h$ are preferably provided with control arms $m$ and $n$ respectively which, when in a certain position, cooperate with noses $i$ and $k$ and thus swing the carriers $g$ and $h$ in such a manner that the load $l$ is raised from its resting position on the ramp or on the trailer vehicle and transshipped.

To enable the operation and the interesting effect of the railroad goods yard as a toy to be more readily understood, the sequence of stages, which can be repeated as often as desired, is hereinafter described.

The train consisting of the self-propelled vehicle $c$ and the trailer vehicle $d$ is at the outset located on the section $o$ of the track $a_1$. When the driving mechanism of the toy vehicle has been switched on the train runs along the track $a_1$ up to the other end thereof where its direction of travel is reversed by the tripper $e$. This tripper $e$ presses against the swing lever $p$ which brings the driving axle $r$, mounted in arcuate segments $q$, out of engagement with a pinion $s$ and into engagement with a pinion $t$. The train then travels in the opposite direction, passing from the track $a_1$ over the crossing $a_3$ on to the track $a_2$. When the trailer vehicle $d$ comes within the range of the ramp $b$, the control arm $n$ of the carrier $h$ mounted on the trailer vehicle $d$ comes into contact with the nose $i$ arranged on the ramp $b$ or the track and is thereby swung. This swinging movement lifts the load $l$ off the trailer vehicle and conveys it over the downwardly sloping surface $u$ on to the ramp $b$.

At the same time the swing lever $p$ runs against the tripper $f$ and swings the driving axle $r$ of the self-propelled vehicle $c$ so that the train again starts off in the opposite direction and travels along the track $a_2$ to the other end thereof. Here the self-propelled vehicle $c$ is again reversed by means of the tripper $e$, whereupon the train on the track $a_2$ runs over the crossing $a_3$ back on to the track $a_1$. When the train running on the track $a_1$ comes within the range of the ramp $b$, the control nose $k$ located on the trailer vehicle comes into contact with the control arm $m$ of the carrier $g$ which is oscillatably mounted in the interior of the ramp $b$. Thereby the nose $k$ swings the carrier $g$ upwards so that the load $l$ resting on the ramp $b$ is lifted and slides over the inclined edge $v$ of the ramp $b$ on to the trailer vehicle $d$. As the trailer vehicle $d$ is also provided with a sloping surface $u$, the load $l$ slides into the proper position thereon.

As the trailer vehicle $d$, due to its inclined surface $u$, is higher on one side than on the other, the tracks $a_1$ and $a_2$ are preferably raised in the region of the ramp on the side for transferring from the trailer to the ramp $b$, whereas the track $a_1$ is sunk.

To ensure, when transferring the load from the trailer vehicle on to the ramp and vice versa, that the driving axle of the self-propelled vehicle is switched over in a reliable manner, the two vehicles are connected by a coupling $w$ which allows a relative change of distance between the self-propelled vehicle and the trailer vehicle.

I claim:

1. A toy railroad comprising: a railroad goods yard including two tracks; a diamond crossing interconnecting said tracks; a self-propelled, load carrying train running alternately on said tracks and reversible at the ends of the yard; a loading ramp at one end of said yard between said tracks; means for transferring automatically a load from said ramp to said train; and means for transferring automatically a load from said train to said ramp.

2. The toy railroad recited in claim 1 in which said means for transferring a load include respectively, carriers mounted in said ramp and in said train, the carrier in said ramp being operable by the running of said train on one of said tracks and the carrier in said train being operable by the running of said train on the other of said tracks.

3. The toy railroad recited in claim 2 including control arms on each of said carriers; a nose carried by said train engageable with the control arm of the carrier in said ramp; and a nose on the track adjacent said ramp and engageable with the control arm of the carrier in said train.

4. The toy railroad recited in claim 1 in which said train includes a tractor vehicle and a load carrying trailer vehicle coupled with said tractor vehicle.

5. The toy railroad recited in claim 4 in which said trailer vehicle is provided with an inclined upper surface to define a high side and a low side, the track on one side of said loading ramp being at a level so that the low side is at substantially the same height as said ramp for unloading said trailer vehicle and the track on the other side of said loading ramp being at a level so that the high side is at substantially the same height as said ramp for loading said trailer vehicle.

6. The toy railroad recited in claim 5 in which said means for transferring a load includes respectively a ramp mounted carrier and a trailer vehicle mounted carrier, each of said carriers being oscillatable about an axle parallel with the tracks on each side of said loading ramp; means on the track on the unloading side of said ramp for actuating the carrier in said vehicle and means on said trailer vehicle operative when said train is on the track at the loading side of said ramp to actuate said ramp mounted carrier to displace a load from the ramp to the trailer vehicle.

References Cited in the file of this patent

UNITED STATES PATENTS

| | | |
|---|---|---|
| 2,290,844 | Smith | July 21, 1942 |
| 2,576,994 | Bianchi et al. | Dec. 4, 1951 |
| 2,876,584 | Smith | Mar. 10, 1959 |

FOREIGN PATENTS

| | | |
|---|---|---|
| 474,640 | Great Britain | Nov. 4, 1937 |